United States Patent [19]
Edelman

[11] 3,877,595
[45] Apr. 15, 1975

[54] BALE LIFTER AND CARRIER
[75] Inventor: Andrew J. Edelman, Sabetha, Kans.
[73] Assignee: Donald L. Johnson, Topeka, Kans.
[22] Filed: Dec. 10, 1973
[21] Appl. No.: 423,318

[52] U.S. Cl. ...... 214/506; 214/DIG. 3; 214/DIG. 4; 214/130 C; 214/147 G
[51] Int. Cl. ............................................. B60p 1/04
[58] Field of Search . 214/506, 505, DIG. 4, DIG. 3, 214/332, 333, 334, 653, 147 G, 130 C

[56] References Cited
UNITED STATES PATENTS

| 272,106 | 2/1883 | Watrous | 214/506 |
|---|---|---|---|
| 1,538,168 | 5/1925 | Cochran | 214/DIG. 4 |
| 2,674,387 | 4/1954 | Ehmann | 214/653 |
| 2,790,564 | 4/1957 | Rockwell | 214/78 |
| 3,452,887 | 7/1969 | Larson | 214/505 |
| 3,529,735 | 9/1970 | Wehde | 214/147 G |

Primary Examiner—Robert J. Spar
Assistant Examiner—Gary Auton
Attorney, Agent, or Firm—John A. Hamilton

[57] ABSTRACT

A lifter and carrier for large cylindrical bales of hay and the like consisting of a wheeled carriage, a cradle supported by the carriage for movement from a horizontally opening position at ground level, wherein the carriage may be maneuvered to engage the cradle with the bale, and an upwardly opening position above ground level wherein the bale is supported for transportation, clamp arms mounted on the carriage and operable to grip the respective ends of the bale, and a single hydraulic cylinder operable both to operate the clamp arms and also to move the cradle between its raised and lowered positions.

4 Claims, 4 Drawing Figures

Fig. 1

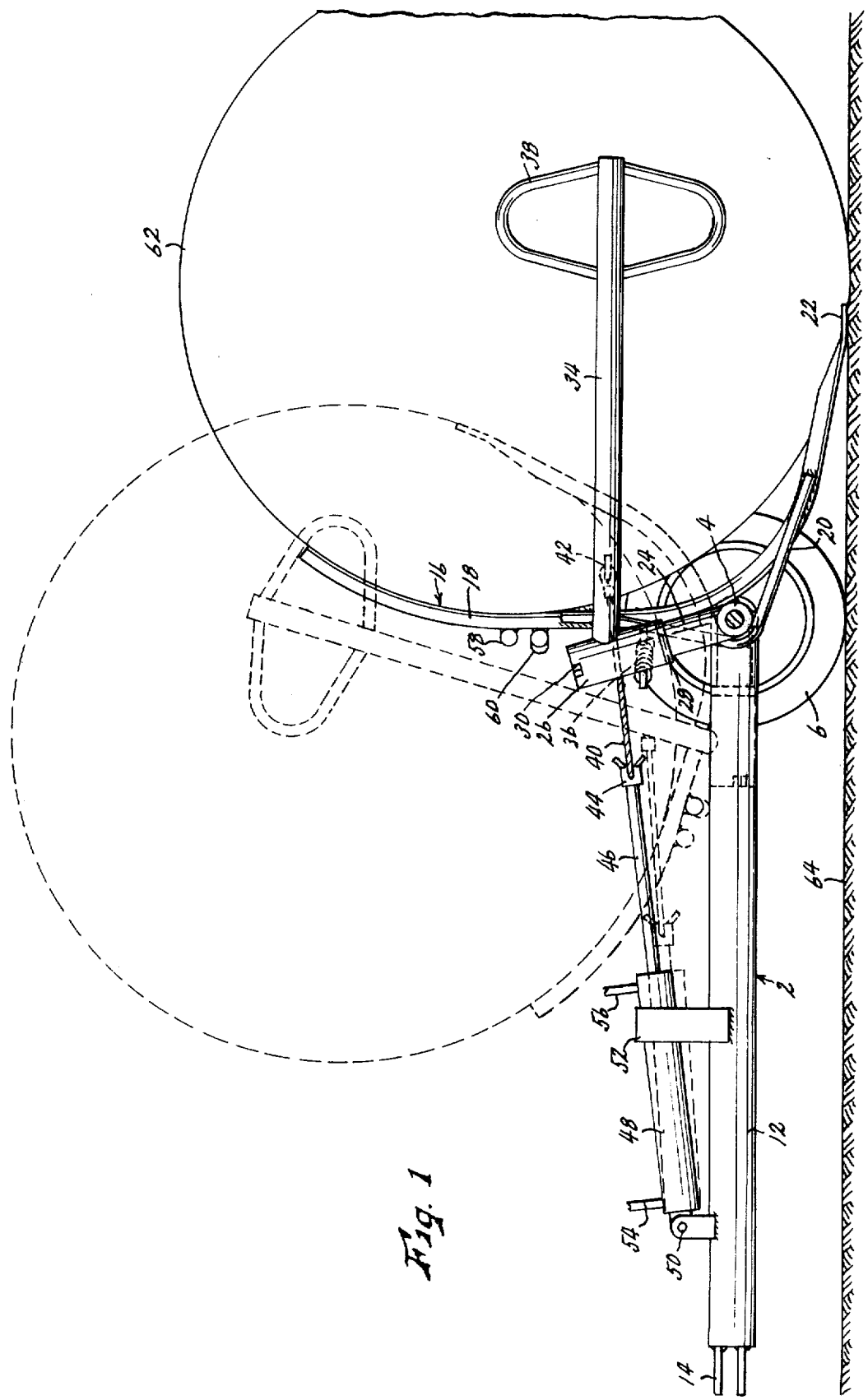

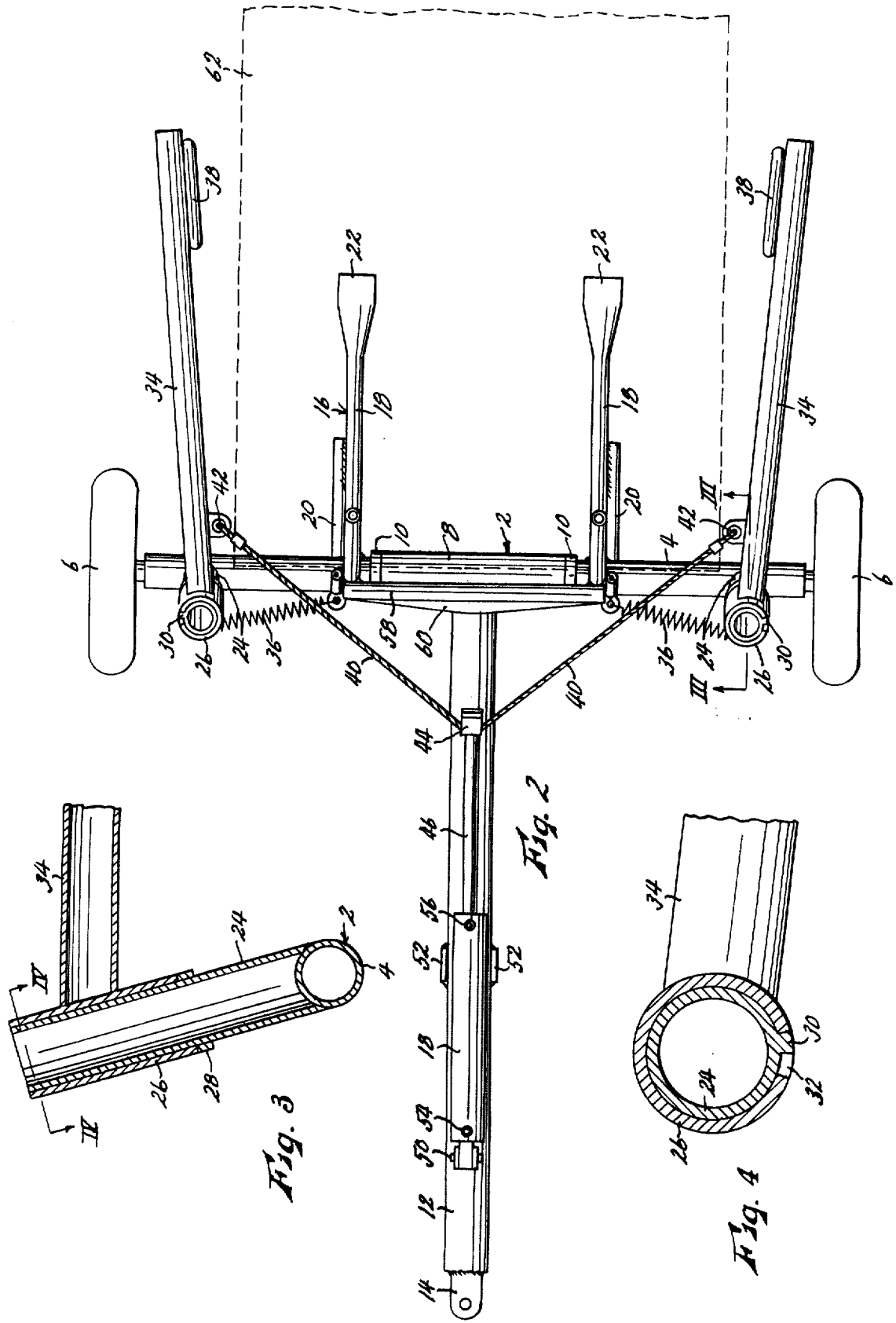

BALE LIFTER AND CARRIER

This invention relates to new and useful improvements in hay handling apparatus, and has particular reference to a device for lifting, supporting and carrying large cylindrical bales of hay or the like.

In view of certain advantages thereof, it has become rather common practice to store hay and the like in large cylindrical bales, a common size being 7 feet in diameter, 6 feet long, and weighing about 2,300 pounds. However, in view of their large size and great weight, a convenient apparatus for lifting, supporting and transporting such bales has remained a problem. The bulk and weight of such bales place them beyond the strength of human operators to lift and handle, and yet they must be lifted from the ground and transported freely from place to place.

Accordingly, the principal object of the present invention is the provision of a lifter and carrier for bales of this type which will conveniently engage and lift a bale from the ground to a transport position. Generally, this object is accomplished by the provision of a wheeled carriage supporting a bale cradle for movement from a horizontally opening position at ground level, in which position the carriage may be maneuvered to engage the cradle with a bale resting on the ground, and an upwardly opening position above ground level to support the bale for transport.

Another object is the provision of a device of the character described including clamping means operable to grip the bale horizontally as it is lifted by the cradle. This insures that the bale will be lifted by the cradle even if said bale is not fully and properly engaged by the cradle, or if the bale is misshapen. The clamping means also continues in operation in the elevated transport position of the cradle, to prevent the bale from being shaken apart, or from being bounced free of the cradle, during rapid transport over rough terrain.

A further object is the provision of a device of the character described wherein both the cradle movement and the clamping means are operated and controlled by a single power device, such as a single hydraulic cylinder.

A still further object is the provision of a device of the character described which may also be used as a feeder, the bale being supported thereby in a position convenient for feeding of livestock directly from the bale.

Other objects are simplicity and economy of construction, and efficiency and dependability of operation.

With these objects in view, as well as other objects which will appear in the course of the specification, reference will be had to the accompanying drawing, wherein:

FIG. 1 is a side elevational view of a bale lifter and carrier embodying the present invention, with the near side carriage wheel removed, showing the cradle at the time it engages a bale in solid lines, and elevated to its transport position in dotted lines, FIG. 2 is a top plan view of the bale lifter and carrier as shown in solid lines in FIG. 1, FIG. 3 is an enlarged, fragmentary sectional view taken on line III—III of FIG. 2, and FIG. 4 is an enlarged, fragmentary sectional view taken on line IV—IV of FIG. 3.

Like reference numerals apply to similar parts throughout the several views, and the numeral 2 applies generally to the carriage of the device. Said carriage includes a horizontal axle 4 extending transversely to the direction of travel, and having a ground engaging wheel 6 rotatably mounted at each end thereof. At the midpoint of the axle, a sleeve 8 is mounted coaxially and rotatably thereon, being restrained against longitudinal sliding thereon by collars 10 fixed on the axle. Affixed to said sleeve and extending forwardly therefrom in the direction of travel is a tongue 12 provided at its forward end with a hitch connection 14 by means of which the carriage may be connected to and drawn by a tractor or other vehicle. Thus it will be seen that axle 4 can rotate about its axis relative to wheels 6 and sleeve 8.

Affixed to axle 4 is a cradle designated generally by the numeral 16, and consisting of a pair of curved cradle bars 18, each of less than semi-circular extent, and each welded intermediate its ends to axle 4, respectively at opposite sides of sleeve 8. Both are disposed in identical angular relation to the axle, the plane of the curvature thereof being normal to the axle. Each is reinforced by a bar 20 curved around the side of axle 4 opposite to that to which the cradle bar is welded, being itself welded to the axle, and at its extended ends to the cradle bar. Referring to FIG. 1, it will be seen that the cradle may, by turning the axle, be moved between a lowered position, as shown in solid lines, in which it opens rearwardly, and a raised position, as shown in dotted lines, in which it opens upwardly. In its lowered position, the lower ends of cradle bars 18, which are flattened to provide planar tines 22, are disposed substantially at ground level.

Adjacent each of wheels 6, an upwardly and rearwardly inclined post 24 is affixed to axle 4, being so inclined when the cradle is in its lowered position, and a sleeve 26 is rotatably mounted on each of said posts, being supported against longitudinal movement on the post at its lower end by a collar 28 fixed on the post, and at its upper end by a finger 30 fixed on the post and extending radially outwardly therefrom into a notch 32 formed in the sleeve. As best shown in FIG. 4, the engagement of finger 30 in notch 32 limits the rotary movement of the sleeve on the post. Affixed to each of sleeves 26 is a clamp arm 34 which extends rearwardly when the cradle is in its lowered position. Said clamp arms are rearwardly divergent, as shown in FIG. 2, at one limit of the rotation of sleeves 26 on posts 24, and are rearwardly convergent at the opposite limit. They are biased to their rearwardly divergent position by a pair of springs 36, each secured at one end to one of sleeves 26, and at its opposite end to the reinforcing bar 20 of the adjacent cradle bar 18. A clamp jaw 38 is affixed to each clamp bar, adjacent the free end thereof and at the side thereof confronting the other clamp bar.

A flexible cable 40 is affixed at one end, as at 42, to each of clamp arms 34, in rearwardly spaced apart relation from the pivot sleeve 26 of said arm. Said cables converge forwardly, and are both attached at their forward ends to a pusher block 44 which is fixed to the rearwardly extended end of the piston rod 46 of a piston, not shown, operatively carried in a double-acting hydraulic cylinder 48 which is disposed above tongue 12 and is pivoted at its forward end, as at 50, to said tongue on a horizontal transverse axis. The rearward end of the cylinder is prevented from moving laterally in a horizontal direction by a pair of vertical guides 52 fixed at their lower ends to tongue 12 and projecting upwardly at respectively opposite sides of the cylinder.

The piston rod 46 may be extended by furnishing hydraulic fluid under pressure to hose 54 of the cylinder, and retracted by furnishing fluid to hose 56. The hydraulic system may be standard, usually operated by the hydraulic system of the tractor vehicle towing the device, and is not here shown in detail. A horizontal cross bar 58 extends between and is rigidly affixed to cradle bars 18, being disposed in spaced apart relation above axle 4 when the cradle is in its lowered position. A second cross bar 60 is disposed just below cross bar 58, and is also affixed to the cradle bars. Cross bar 60 is bowed somewhat to the rear in the midportion thereof. When the cradle is in its raised position, as shown in dotted lines in FIG. 1, cross bar 60 engages tongue 12 to support the cradle under some circumstances, as will appear, and cross bar 58 extends transversely to the tongue in spaced relation thereabove.

In operation, it will be seen that when cradle 16 is in its lowered position as shown in solid lines in FIG. 1, the tines 22 of cradle bars 18 are disposed substantially at ground level. The length of cables 40 is so selected that this condition prevails when piston rod 46 is fully extended. With the cradle in this position, it can be backed to engage a cylindrical bale 62 of hay or the like resting on the ground surface 64, by maneuvering carriage 2 and the towing tractor vehicle. Clamp arms 34 will at this time be disposed in their rearwardly divergent positions, so that they do not engage the ends of the bale, also as indicated in FIG. 2. The flattening of cradle tines 22 permits them to be inserted beneath the bale as shown.

Piston rod 46 is then retracted by furnishing hydraulic fluid to hose 56 of cylinder 48. During the initial portion of this movement, cables 40 pivot clamp arms 34 inwardly, against the tension of springs 36, to clamp the bale endwise and very tightly between clamp jaws 38 thereof. When the cable tension exceeds the weight of the bale, it causes the cradle, clamp arms and bale to pivot upwardly and forwardly over the carriage axle 4, as shown in dotted lines in FIG. 1. In initiating and continuing this movement, clamp arms 34 and their jaws 38 are quite important, since they perform at least as large a portion of the bale lifting function as do the cradle tines. Therefore it is not necessary that the tines be originally extended rearwardly under the bale past the vertical plane of its center of gravity, since the clamp arms supply a portion of the lifting power, and defeat any tendency of the bale to roll rearwardly off of the tines as the cradle itself is elevated. As a matter of fact, the drawing shows the tines of such abbreviated length that they actually do not project to the vertical plane of the center of gravity of the bale in the solid line position of FIG. 1. They could of course be made longer, this being somewhat a matter of choice, except that making them longer would make them correspondingly more difficult to insert beneath the bale. They can be inserted easily to the extent shown. Moreover, cylindrical bales of the type shown often become deformed if allowed to remain in the field for extended periods of time, tending by their own weight to assume a generally oval cross-sectional contour. This increases their area of contact with the ground, which renders it correspondingly more difficult to insert the cradle tines therebeneath, and also increases the horizontal distance beneath its forward edge and its center of gravity, in many cases rendering it virtually impossible to insert the tines far enough to underlie the center of gravity.

The use of clamp arms 34, and the bale lifting action provided thereby, overcomes these difficulties, providing reliable elevation of the bale even if the center of gravity of the bale is originally disposed considerably to the rear of cradle tines 22. In many cases, the clamp arms would in fact lift the bale even in the complete absence of the cradle. As the bale is lifted and pivoted forwardly, but before it reaches the dotted line position of FIG. 1, its center of gravity passes forwardly through the vertical plane of axle 4, provided that it is not excessively deformed as described above, and will continue to the dotted line position of FIG. 1 by gravity. During this gravity movement, cables 40 will be momentarily slack, permitting clamp arms 34 to be moved outwardly by springs 36 to release the bale. Thus, in the event that the bale was not up to this time fully and properly engaged in the cradle, it will at this time settle firmly into the cradle, and when the hydraulic cylinder catches up with the gravity motion, cables 40 will again be drawn taut to actuate the clamp arms to clamp the bale firmly in place. Of course, if the bale is so badly deformed that its center of gravity never passes forwardly over axle 4, and this is quite possible, then there is no gravity motion period as described, and cables 40 remain taut at all times. The forward motion of the cradle is of course arrested when cross bar 60 thereof engages tongue 12, as shown in dotted lines in FIG. 1, but pressure is ordinarily maintained in the rearward end of cylinder 48 at this time, for purposes of transporting the bale.

As long as this pressure is maintained, the bale may be transported safely even at rather high speeds over very rough terrain, the tension of cables 40 preventing the cradle from pivoting rearwardly, and the clamping action of arms 34 and jaws 38 preventing the bale from being shaken apart or bounced free of the cradle. This is a substantial advantage over many bale carriers presently in use. The bale may also be unloaded to the ground whenever desired. If a badly deformed bale is such that its center of gravity has remained to the rear of axle 4, it may be dumped simply by releasing the hydraulic pressure in the rearward end of cylinder 48. Normally, however, and with most bales, the cradle will rest by gravity in the dotted line position of FIG. 1 when all hydraulic pressure is relieved. In these cases, the bale may be dumped by extending piston rod 46 by supplying fluid through hose 54 to the forward end of cylinder 48. As the piston rod is extended, pusher block 44 at its extended end engages and moves cradle cross bar 58, pivoting the cradle to overbalance it to the rear. It will be noted also that in the dotted line position of FIG. 1 the bale is supported out of contact with the ground, but at an elevation, and easily accessible, for direct feeding therefrom by cattle and the like. This feeder usage of the device also increases its general utility.

While I have shown and described a specific embodiment of my invention, it will be readily apparent that many minor changes of structure and operation could be made without departing from the spirit of the invention.

What I claim as new and desire to protect by Letters Patent is:

1. A lifter and carrier for a cylindrical bale of hay or the like comprising:

a. a carriage adapted to be moved over the ground, b. a cradle of generally arcuate curvature in cross-sectional contour about a horizontal axis, mounted pivotally on said carriage for movement about a horizontal axis disposed externally of its curvature and parallel to the general axis of curvature thereof, being movable between a lowered position in which it opens horizontally rearwardly with respect to the normal direction of travel of said carriage, with its lower extremity substantially at ground level, its lower edge, when in said lowered positions, being insertable by movement of said carriage between the ground and a cylindrical bale resting on its cylindrical surface, to engage said cradle with said cylindrical surface, and a raised position in which it is disposed entirely above ground level and opens upwardly, c. a pair of clamp arm supports mounted in said carriage and movable with said cradle, d. a pair of clamp arms pivoted respectively on said supports and extending generally rearwardly from their pivots when said cradle is lowered, whereby to be disposed respectively at opposite ends of a bale engaged in said cradle, and pivoted on axes generally normal to said cradle pivotal axis, e. clamp jaws carried at the free ends of said clamp arms, f. resilient means biasing said clamp arms pivotally apart whereby said jaws do not engage said bale, g. a single operating member carried by said carriage for movement in a generally straight line, h. connecting means joining said operating member to said cradle and jaws and operable, during movement of said operating member in one direction first to actuate said clamp arms to grip said bale between said jaws with an endwise pressure, and then to elevate said cradle from its lowered position to its raised position, and i. power means operable to move said operating member.

2. A device as recited in claim 1 wherein said connecting means comprises a pair of flexible cables affixed respectively to said clamp arms at points rearward of their pivotal axes, said cables converging forwardly and being connected at their forward ends to said operating member, and wherein said power means is operable to move said operating member forwardly, whereby tension of said cables first pivots said clamp arms inwardly against said biasing means to clamp said bale between said jaws, and then pivots said cradle toward its raised position after the cable tension becomes sufficient for this purpose.

3. A device as recited in claim 2 wherein said power means moves said operating member forwardly at a uniform rate, and wherein the center of gravity of a bale engaged in said cradle moves through the vertical plane of the pivotal axis of the cradle as said cradle moves toward its raised position, whereby it may complete its movement to its raised position by gravity, whereby said cables are momentarily relaxed and said clamp arms momentarily released, and the bale may settle firmly into said cradle.

4. A device as recited in claim 2 wherein said power means is also operable to move said operating member rearwardly, said operating nember being operable during said rearward movement to engage and pivot said cradle to its lowered position.

* * * * *